United States Patent [19]

Hayden et al.

[11] Patent Number: 5,076,658
[45] Date of Patent: Dec. 31, 1991

[54] NON-LINEAR OPTICAL POLYMERIC FIBER WAVEGUIDES

[75] Inventors: L. Michael Hayden, Lakeland; Gerald F. Sauter, Eagan; Peggy Pasillas, Inver Grove Heights, all of Minn.

[73] Assignee: Unisys Corporation, Blue Bell, Pa.

[21] Appl. No.: 516,942

[22] Filed: Apr. 30, 1990

[51] Int. Cl.$^5$ ............................ G02B 6/02; G02F 1/35
[52] U.S. Cl. .......................................... 385/1; 385/12; 385/122; 385/143; 359/341
[58] Field of Search ................. 350/96.29, 96.34, 96.3, 350/96.13, 96.15

[56] References Cited

U.S. PATENT DOCUMENTS

| | | | |
|---|---|---|---|
| 4,431,263 | 2/1984 | Garito | 350/96.34 |
| 4,887,884 | 12/1989 | Hayden | 350/96.13 X |
| 4,909,596 | 3/1990 | Okazaki et al. | 350/96.29 |
| 4,909,598 | 3/1990 | Ninomiya et al. | 350/96.29 X |
| 4,917,455 | 4/1990 | Soane | 350/96.34 |
| 4,936,645 | 6/1990 | Yoon et al. | 350/96.15 X |
| 4,955,977 | 9/1990 | Dao et al. | 350/96.34 |
| 4,965,020 | 10/1990 | Allen et al. | 350/96.13 X |

OTHER PUBLICATIONS

*Optical Electronics,* Yariv, Holt Rinehart and Winston, Inc, pp. 252-258, ©1985.
*Optics,* Hecht and Zajac, Addison-Wesley Pub., pp. 504-505, ©1979.

Primary Examiner—John D. Lee
Assistant Examiner—Stephen W. Barns
Attorney, Agent, or Firm—Arnold L. Albin; Glenn W. Bowen; Mark T. Starr

[57] ABSTRACT

An optical waveguide is comprised of an optical fiber having a core and a cladding wherein the core comprises an organic polymer media exhibiting non-linear optical response over a predetermined optically transmissive region, the polymer having a predetermined index of refraction and the fiber having a predetermined uniform diameter and an arbitrary length. The fiber inherently possesses waveguide properties which are utilized for the detection of radio frequency fields, modulating optical signals, frequency doubling, and as a parametric amplifier.

14 Claims, 3 Drawing Sheets

NON-LINEAR OPTICAL POLYMERIC FIBER WAVEGUIDES

BACKGROUND OF THE INVENTION

1. Field of the invention

The invention relates generally to optical fibers and, more specifically, to optical fiber waveguides formed of a non-linear optical (NLO) polymer which has been electrically poled to induce a permanent, noncentrosymmetric molecular orientation.

2. Description of the Prior Art

Optical fiber waveguides are now widely used in a variety of applications. For example, optical glass fiber transmission lines defining an optical waveguide are now used to transmit voice or data signals in the form of a modulated light beam. Such optical fibers have been fabricated of a glass core of a relatively high index of refraction, surrounded by a glass cladding having a relatively lower index of refraction, and typically have a diameter of about 125 microns, although they may range up to 1000 microns, for a multi-mode waveguide. These fibers may then be coated with a protective material to protect the glass fiber from abrasion and enhance the structural properties for handling in the field. Materials commonly employed for optical fibers are usually inorganic.

Devices for use in optical communications, such as modulators, switches, multiplexers and demultiplexers have been fabricated by coating inorganic crystals, such as niobates and tantalates, having non-linear optical properties, with conductive layers whereby the index of refraction may be varied in accordance with an applied electric field or control signal. However, low device yields, a high dielectric constant and degradation induced by the laser light source have resulted in consideration of other techniques and materials. Semiconductor devices integrated directly with a laser source have been found to have low efficiency, and the electro-optic coefficients and modulation bandwidth are less than needed for high-speed and high-channel capacity.

Planar electro-optical (E-O) devices in which an applied voltage induces a change in refractive index substantially proportional to the applied voltage are well known in the art. See, for example, U.S. Pat. No. 4,767,169, "Thin Film Waveguide Electro-Optic Modulator". Such devices can be constructed to form waveguides, switches or modulators, for example, and may utilize interference effects, directional coupling or rotation of the plane of optical polarization. Extensive background studies may be found in "Non-linear Optical Properties of Organic and Polymeric Materials", D. J. Williams, Ed., ACS Symposium Series 233, Washington, D.C. (1983), which is hereby incorporated by reference.

While electro-optical devices utilizing bulk-grown inorganic crystals as the propogating medium are well known and widely utilized, they are difficult to grow and process and are limited in bandwidth response. Planar E-O waveguides have also been constructed using certain organic and polymeric materials which exhibit substantial non-linear responses when poled, and provide damage-free thresholds against the operative electric fields and applied laser beams. However, after formation, the delicate polymer films are subject to mishandling and mechanical damage. In addition, the high-intensity electric fields necessary to polarize the medium (e.g., field strengths in excess of 100,000 V/cm) can induce structural damage to the polymer.

U.S. Pat. No. 4,887,884, assigned to the assignee of the present invention, provided a structure in which an optical polymer was encapsulated in an optically transparent hollow fiber to provide physical protection during poling and subsequent handling without impairing the desired optical properties. However, this device had a limited length of 10 to 15 cm and was not suitable for fabrication in extended lengths.

The present invention provides for fabricating a non-linear polymeric material in the form of a continuous optical fiber, thereby forming an optical waveguide of low loss and arbitrary length. Advantageously, the fiber geometry provides the necessary optical and physical compatibilities with existing optical circuit elements to form frequency doublers, parametric amplifiers, phase shifters and modulators, as well as low-loss transmission lines for use in multi-node networks. Remote fiber sensing of electric fields is also contemplated.

SUMMARY OF THE INVENTION

The invention comprises an optical fiber device having a core and a cladding, wherein the core comprises an organic polymeric medium exhibiting non-linear optical response over a predetermined optically transmissive region, the polymer having a uniform index of refraction and polarized to align a plurality of non-centrosymmetric molecules orthogonally to a longitudinal axis thereof, and the fiber having a predetermined uniform diameter and arbitrary length.

DESCRIPTION OF THE PREFERRED EMBODIMENT

An organic polymeric film will exhibit second order non-linear optical properties in accordance with the well-known Pockels effect if the film is doped with noncentrosymmetric molecules and is organized to retain its noncentrosymmetric properties during fabrication of the waveguide. Electrically induced poling by applying a high-intensity direct current field is known by those skilled in the art to provide a stable molecular alignment which imparts E-O properties to the polymer substance. Methods for poling the polymer are described in said U.S. Pat. No. 4,887,884, which is hereby incorporated by reference.

Figure 1:
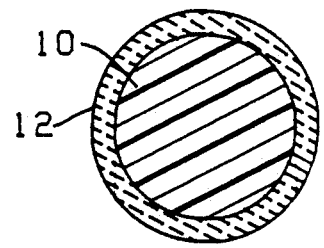
FIG. 1 is a greatly-enlarged cross-sectional view of an embodiment of the invention.

The present invention provides for forming an optical fiber comprised of a polymer core and a coating which may be glass or polymer, in which the fiber is then preferentially polarized to provide selective E-O properties. A plastic fiber is formed in a known manner such as by drawing a polymer preform down to yield a desired bore diameter. FIG. 1 is a greatly-enlarged cross-sectional view of an emodiment of the invention, comprising a polymer core 10 and an optical fiber cladding 12 of different refractive index. The plastic fiber shown in FIG. 1 has a circular cross-section but other cross-sectional shapes may also be utilized, such as elliptical or rectangular. Conventional fibers used in fiber optics have a small diameter, it being understood that the fiber can be made of any thermosetting plastic material having a suitable refractive index and can be of any suitable length and other diameters, the material lengths, and diameters being dependent on the intended use of the fiber. Any material with an appropriate refractive index and which can act as a cladding for the light guide and, preferably which provides protection from the poling field, is suitable for use in coating the core 10. Typically, core 10 is of the order of 80 um diameter and cladding 12 about 125 um diameter.

The polymer core 10 is comprised of any polymer of good optical transmission quality and can be mixed with, in the case of guest/host systems, or attached to, in the case of side/chain systems, an optically non-linear molecule. The optically non-linear molecule is not critical, it being central, however, that the polymer core have a greater refractive index than the cladding. Numerous polymers and NLO molecules are available and will allow construction of the device. One suitable material for the host polymer is poly(methylmethacrylate) (PMMA), or poly(styrene) (PS), and derivatives and co-polymers of these because of the low intrinsic optical loss due to their amorphous structures. Disperse Orange #3 and Disperse Red #1 have been used as the NLO guest substance. These materials are commercially available. The mixture typically provides a refractive index of the order of 1.49 at a wavelength of 589 nm.

Optical fibers of the present invention may be fabricated by heating a polymer preform formed of a polymer core and polymer cladding in a furnace until the preform softens, about 100 degrees C., and drawing a fiber therefrom. The polymer core and cladding maintain their relative geometrical proportions over a great attenuation of diameter, which may be as high as 300:1. Further, the refractive index profile of the core and cladding in the preform is maintained in the drawn fiber. The diameter of typical plastic optical fibers ranges from 100-1000 um for multi-mode fibers. Arbitrarily long lengths may be drawn with very high tensile strengths.

Figure 2:
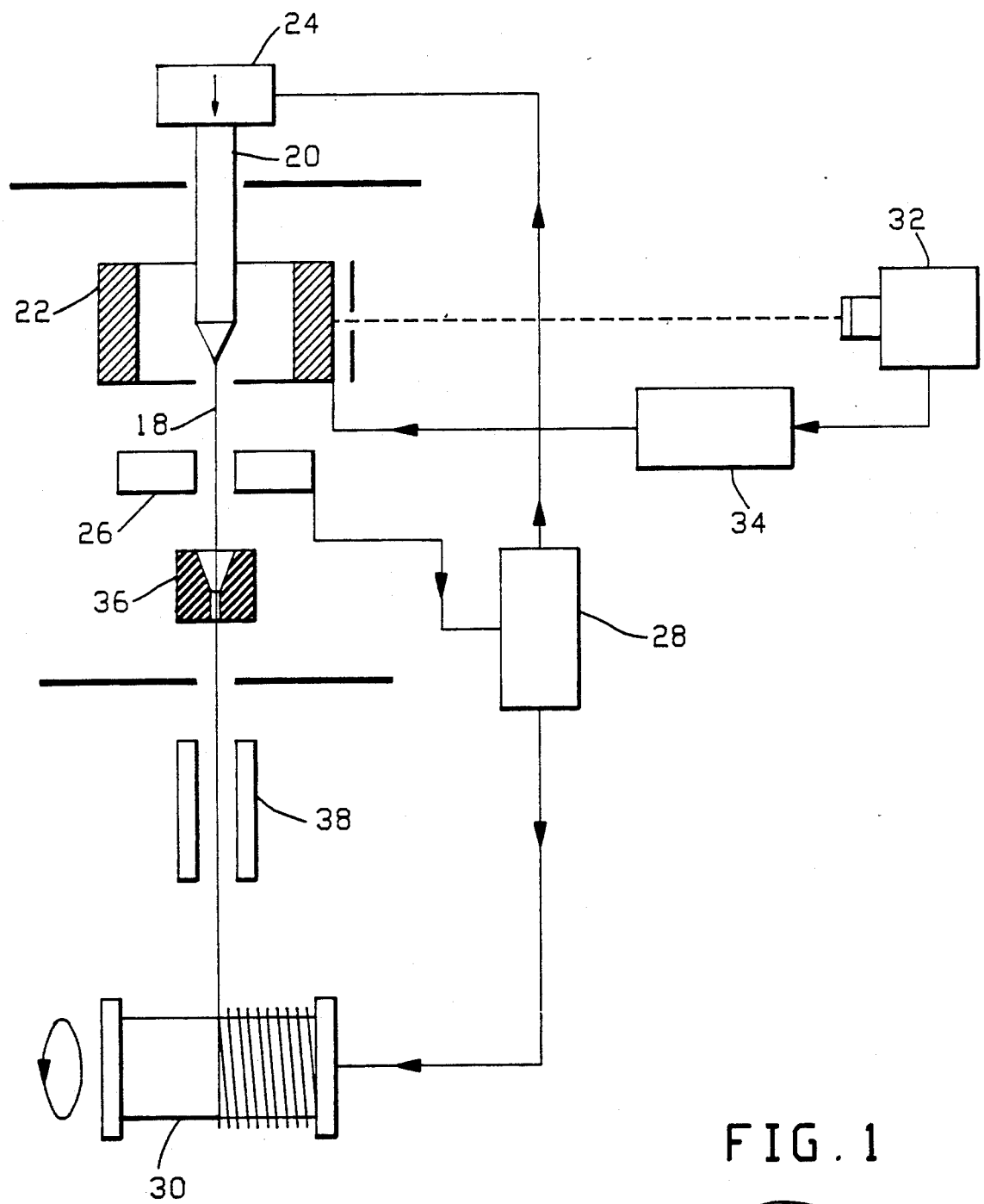
FIG. 2 is a simplified view of the process for producing the optical fiber shown in FIG. 1.

The invention may be fabricated as schematically represented in FIG. 2, which is an apparatus used for fabrication of conventional optical glass fibers. Organic non-linear optical materials with high second order susceptibility may be fabricated from a polymeric optical medium doped with a non-linear optical substituent in a similar manner. The polymer medium has a higher refractive index (e.g., 1.4–1.7) than the cladding layer.

A preform 20 comprising a matrix of core 10 and coating 12 is melted in a heating furnace 22 and then drawn into a fine filamentary optical fiber 18. Reference numeral 26 represents a fiber diameter measuring device, which may be, for example, an optical sensor, and reference numeral 28 a fiber diameter control circuit. By adjusting the rate of the preform drive screw 24 and the rotating speed of capstan 30, the fiber diameter is adjusted to a substantially constant value. A thermal sensor 32 operates through a temperature control circuit 34 to suitably maintain the temperature of furnace 22 at a constant value. The optical fiber 18 is passed through a coating vessel 36 holding a coating material, such as a polymer or a rubber, and a heating furnace 38 for curing the coating. The fiber 18 may also be fed through an extruder (not shown) for further reducing the diameter of the fiber and adjusting it to a substantially constant value. In an alternative embodiment, the preform 20 will be comprised solely of the core polymer and the coating polymer applied similar to that shown by vessel 36 and heating chamber 38.

The drawing rate would be similar to that used in standard plastic optical fiber manufacture, since the inclusion of the NLO doping material does not drastically effect the structural properties of these polymers. The normal or linear properties of these NLO fibers will be the same as their pure plastic optical fiber cousins with the exception that they will have a large optical absorption near the absorption band of the NLO substituent. This fact will require that the NLO fiber be used at frequencies which avoid the absorption band. The refractive index may be "tuned", depending on the NLO substituent, and this selectivity may be exploited in applications.

After fabrication of the fiber, it is then subjected to exposure to a DC poling field, as described above. Poling may be accomplished in a continuous manner, similar to that employed for drawing the fiber, or selectively applied to predetermined segments of the fiber to provide properties in a manner to be described below. The polymer fiber, when heated to its glass transition temperature and poled in an electric field to achieve molecular orientation of the NLO additives parallel to the direction of the electric field, will induce a noncentrosymmetry in the poled domain of the polymer medium and results in establishing second order nonlinear optical susceptibility in the polymer medium. Poling may be accomplished by again heating the polymer fiber near its glass transition temperature and applying a DC electric field (e.g., 50-150 V/um) to the medium to align molecular dipoles in a uniaxial orientation. The medium is then cooled while under the influence of the applied electric field. This process results in a substantially stable and permanent molecular orientation immobilized in a rigid structure within the poled domain.

Figure 3:
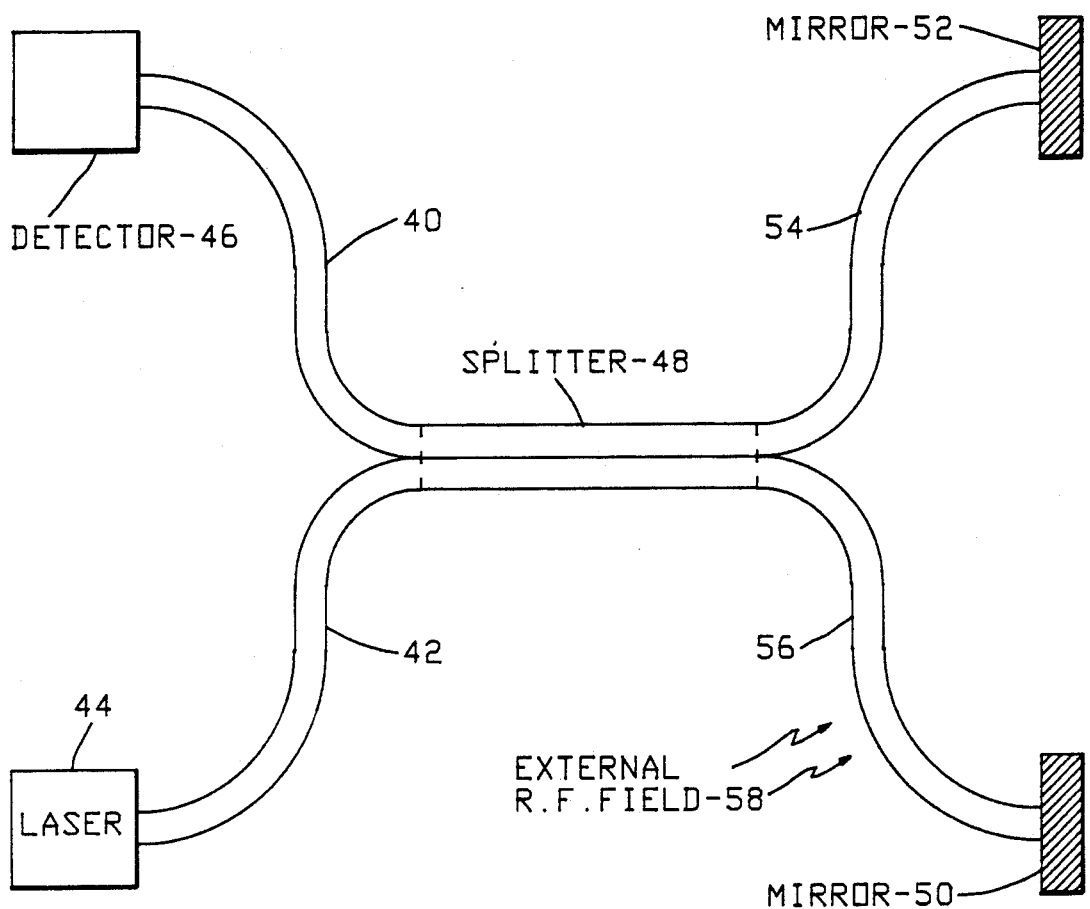
FIG. 3 is a schematic representation of a preferred interferometer assembly embodying the present invention.

Referring now to FIG. 3, there is shown an application of the present invention when utilized as an electric field sensing interferometer. Fibers 40 and 42 comprise NLO polymer media which have been fabricated as described above. A laser 44 is coupled to one end of fiber 42 in a conventional manner. Detector 46 is coupled to the corresponding end of fiber 40. Fibers 40 and 42 are closely coupled to form a splitter 48 over a predetermined length sufficient to provide evanescent coupling at the operating frequency of the laser. The opposing ends of fibers 42 and 46 are coupled to mirrors 50 and 52, respectively. Mirrors 50 and 52 may be formed by vacuum evaporation onto the fiber end-face. Fiber arms 54 and 56 may have arbitrary unequal lengths. In operation, the laser 44 emits light that is injected into one arm of the splitter 48. Upon reaching splitter 48, the light is divided into arms 56 and 54. The light reaching splitter 48 from fiber 42 is conducted through arm 56 to mirror 50, where it is reflected back to splitter 48. In a similar manner, a portion of light from laser 44 is conducted through fiber 42 to splitter 48 and coupled through arm 54 to mirror 52, where it is reflected back through arm 54 to splitter 48. When the reflected light from the two arms 54 and 56 is recombined, the result will be destructively or constructively added, and conducted through fiber 40 to detector 46. This may produce interference fringes at detector 46. This is standard operation for an all-fiber interferometer.

When the sensing arm is exposed to a radio frequency field, the polymer fibers interact with the external R.F. field 58, the refractive index of the NLO material in arm 56 is caused to change in proportion to the magnitude of the field, thus causing the light in arm 56 of the interferometer to undergo a further phase change relative to arm 54. This additional phase change is then detected by detector 46. The long interaction length provided by the low loss NLO fiber geometry and the very high non-linearity of the polymer provides extreme sensitivity not attainable by prior art interferometers.

Figure 4:
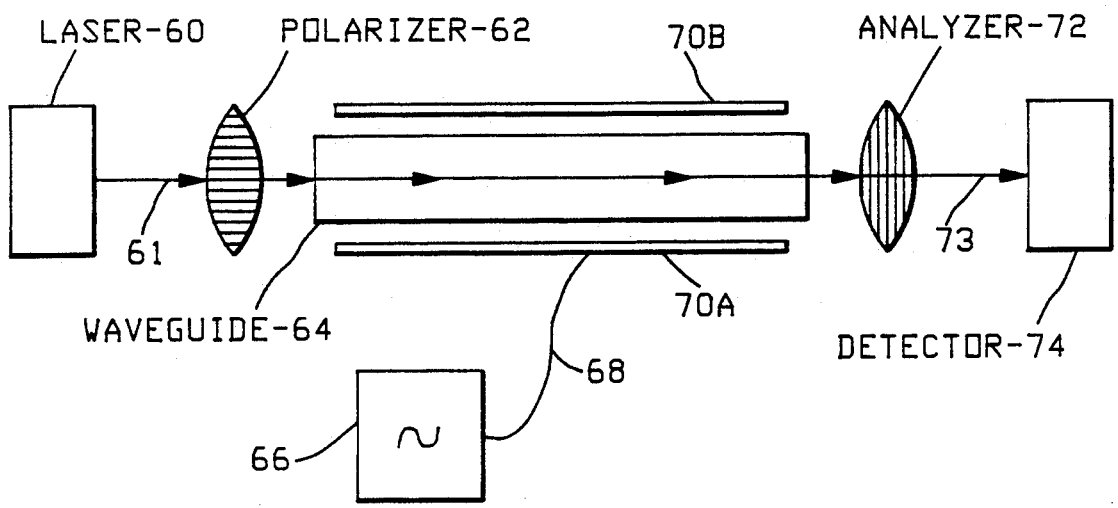
FIG. 4 is a schematic representation of a preferred electro-optic modulator assembly embodying the present invention.

FIG. 4 is illustrative of an optical waveguide configured from the NLO polymer fiber. One of the principal advantages of an optical waveguide configuration as contrasted to bulk crystals is that much higher intensity electric fields may be used with the optical waveguide configuration and also much lower capacitive values may be realized. Both of these operative characteristics are necessary to achieve high-speed operation of such electro-optic modulators. Thin film waveguide electro-optic modulators are known in the prior art which employ one of three modulating mechanisms, i.e., Mach-Zehnder interferometry, directional coupling, or rotation of the optical polarization.

The NLO fiber is particularly suitable for a low-voltage operating electro-optic modulator, since the non-linear media are highly responsive to electric fields. FIG. 4 is a schematic representation of an embodiment of the invention for amplitude modulation of light waves. A laser light source 60 provides a light beam 61 which enters a polarizer 62, which polarizes the light beam as it enters NLO fiber waveguide 64. Electrodes 70A and 70B are applied to waveguide 64 for setting up an electric field in the waveguide in response to a signal source 66 which is coupled to the electrodes by lead 68. Light exiting the waveguide enters analyzer 72 and the output beam 73 is applied to a detector 74. A bias applied by signal source 66 to electrodes 70A and 70B has the effect of setting up an electric field in waveguide 64 which changes the phase of the light as it advances through the waveguide as a result of the corresponding change in index of refraction. Thus, the polarization of light exiting through analyzer 72 may be varied. If polarizing analyzer 72 is oriented to pass a maximum of light when no voltage is applied to electrodes 70A and 70B by a lead 68, application of a voltage to these electrodes will change the polarization of exiting light and therefore reduce the amount of light that polarizing analyzer 72 will pass. In this manner, the modulator may be used to vary the magnitude of the light beam.

Figure 5:
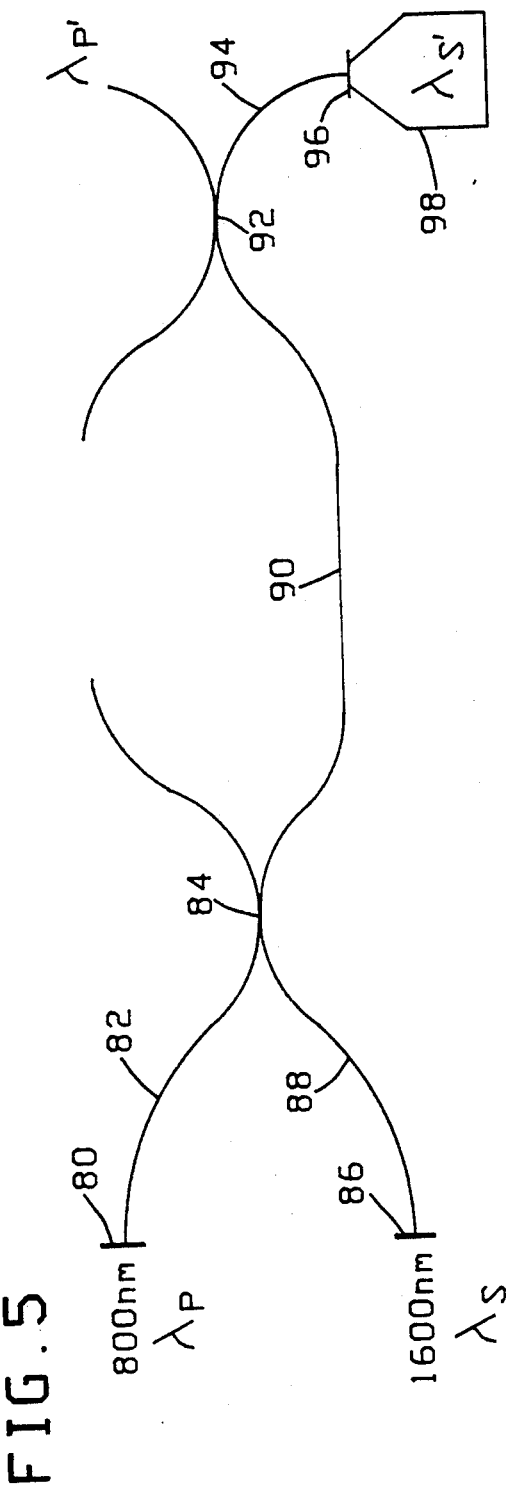
FIG. 5 is a schematic representation of a preferred electro-optic parametric amplifier embodying the present invention.

In the drawing of FIG. 5 there is shown an arrangement for use as an amplifier. The signal $\lambda_p$ at a frequency of 800 nm is applied to coupling device 80, which might simply be an in-line coupling to fiber 82. Fiber 82 is coupled to a wavelength selective directional coupler 84. Signal $\lambda_p$ is a strong signal used as the pump signal. A weak desired signal $\lambda_s$ at a frequency of 1600 nm is applied to coupling 86 and transmitted through fiber 88 to coupler 84. Fibers 82 and 88 may be constructed of NLO fiber as in the present invention or of conventional silica or plastic media. The pump-enhanced signal is applied through coupler 84 to NLO fiber section 90. Due to the strong non-linearity of NLO fiber 90, over a suitable length of fiber the pump signal $\lambda_p$ will be depleted while the desired signal $\lambda_s$ will be amplified. The signals carried by NLO fiber 90 are applied to a further selective wavelength directional coupler 92 for providing the amplified output as coupled through fiber 94 to coupling device 96 and utilization device 98. The amplified output signal $\lambda_s'$ is applied to utilization device 98. The depleted signal $\lambda_p'$ appears in the opposing output leg of coupler 92.

It may be seen that the above-described parametric amplifier in useful in a local area network (LAN) that is limited in the number of users or nodes that it can have by the power losses in the system. Use of NLO fibers in a manner described would obviate the power budget problems inherent in multi-user systems.

Figure 6:
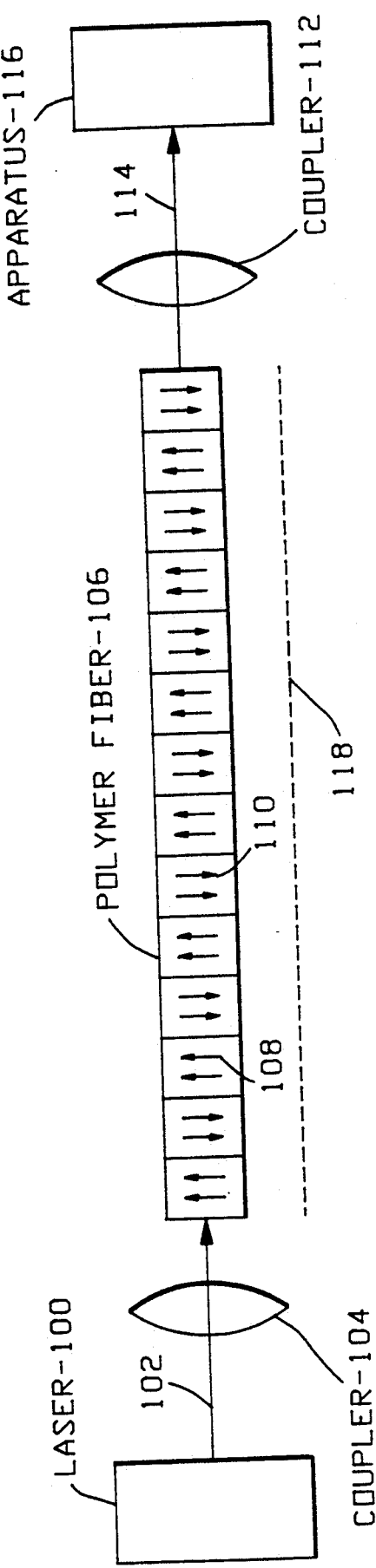
FIG. 6 is a schematic representation of a frequency doubler embodying the present invention.

A still further application of the present invention is shown in FIG. 6, which is illustrative of a frequency doubling polymeric waveguide. Diode lasers are the key component in CD music players and, more importantly, in CD optical memories. Optical disk technology may be greatly enhanced through improved retrieval storage density. Available diode laser sources are operative in the 400–500 nm range. The amount of storage readable on an optical disk could be increased by nearly four times if the wavelength of the diode lasers used in these devices could be reduced by a factor of 2. The present invention provides for using an NLO fiber to frequency double (one-half the wavelength) the output of a diode laser. This is achieved by selectively poling a length of NLO fiber, which results in a spatially periodic non-linear structure for frequency conversion of the electromagnetic energy. This results in an optical fiber with a periodically modulated non-linear optical coefficient. When the molecular domains of the successive zones have been alternately polarized in opposite directions, the non-linear coefficient of the media alternately has opposite signs in the successive zones. This results in a quasi-phase matching condition between oppositely polarized signals at the fundamental and harmonic frequency.

Referring now to FIG. 6, in practice, NLO fiber 106 is utilized in combination with a transverse magnetic (TM) polarized laser radiation source 100, which provides 780 nm wavelength input laser beam 102, a pair of lens coupling means 104, 112, which couple laser beam 102 to polymer fiber 106, and utilization apparatus 116, such as an optical disk data recording unit. The input TM polarized coherent electromagnetic radiation preferably is a laser beam such as that generated by a diode laser with a wavelength in the 700–1300 nm range. The coupling means can comprise a pair of lenses, cleaved end-faces of the waveguiding structure, or other conventional means. A voltage (not shown) is applied to a grid 118 with opposing polarity between electrodes. That results in poled domains alternately oriented in directions 108 and 110. An optimum spacing for the electrodes can be determined by forming several sets of electrodes differing in spacing and determining which set produces the best phase matching by measuring the harmonic power generated. The exact value of the applied voltage may also be experimentally determined in this manner. Thus, by applying a suitable electric field to each zone, it is possible to modify the indices of refraction differently, and by virtue of the possibility of dynamic electrical adjustment, it is possible to maximize the harmonic power for a given frequency and structure.

The term "optically transparent" as employed herein is defined as an optical medium which is transparent or light transmitting with respect to incidental light frequencies and exiting light frequencies.

The term "poling" as employed herein refers to the application of an electric field which is applied to a host medium at the glass-temperature transition state to induce stable uniaxial molecular orientation when the host medium is cooled and solidified.

While the invention has been described in its preferred embodiments, it is to be understood that the words which have been used are words of description rather than of limitation and that changes may be made within the purview of the appended claims without departing from the true scope and spirit of the invention in its broader aspect.

We claim:

1. In an optical fiber device comprising a core and a cladding,, the improvement wherein the core comprises an organic polymer medium organized to exhibit non-linear optical response over a predetermined optically transmissive region, said polymer medium having a predetermined index of refraction, said fiber device having a predetermined uniform diameter and an arbitrary length, said polymer medium polarized to align a plurality of non-centrosymmetric molecules orthogonally to a longitudinal axis of said fiber device.

2. An optical fiber device as set forth in claim 1, the indices of refraction of said core and said cladding being such as to comprise an optical waveguide.

3. An optical fiber device as set forth in claim 2, said polymer having a uniform predetermined index of refraction.

4. An optical fiber device as set forth in claim 2, further comprising input means for coupling light into said fiber and output means for coupling light out of said fiber.

5. An optical fiber device as set forth in claim 4, further comprising sensing means for detecting light transmitted by said fiber.

6. An optical fiber device as set forth in claim 5, further comprising electrode means for applying a predetermined electric field to said optical fiber in accordance with a desired signal,
means for applying a polarized light source to said optical fiber, and
means responsive to light exiting from said fiber for repolarizing and providing said repolarized light to said means for detection.

7. An optical fiber device as set forth in claim 5, comprising:
means for providing a desired signal at a first predetermined frequency and first amplitude,
means for providing a second signal having an amplitude greater than said first signal at a frequency an integral multiple of said first frequency,
means for combining said first and second signals and applying said combined signals to at least a portion of said optical fiber, and,
means responsive to a signal exiting from said optical fiber for selectively applying said signal at said first frequency and at an augmented amplitude to said means for detecting light.

8. An optical fiber device as set forth in claim 4, further comprising means for exposing at least a portion of said fiber to sense a radio frequency field, said fiber device responsive to the intensity of said field so as to induce a change in index of refraction proportionate thereto.

9. An optical fiber device as set forth in claim 4, wherein the frequency of light exiting said fiber is a second harmonic of the frequency of the light entering the fiber.

10. An optical fiber device as set forth in claim 4, wherein the light exiting the fiber is amplitude modulated.

11. An optical fiber device as set forth in claim 4, wherein the light exiting said fiber is amplified.

12. An optical fiber device as set forth in claim 4, wherein the light exiting from said fiber is frequency selected.

13. An optical fiber device as set forth in claim 2, further comprising:
means for selectively and periodically varying the refractive index of portions of said fiber,
means for applying a first optical signal to said fiber,
means for deriving an output signal from said fiber at an integral multiple of the frequency of said input light source, and,
electrode means coupled to a source of potential for modulating said refractive index so as to augment said output at said integral multiple of frequency.

14. Apparatus for sensing an external radio frequency field, comprising:
organic polymer fiber means exhibiting non-linear optical response,
means for applying a light source to said organic fiber means,
means for applying said radio frequency field to said organic fiber means,
means responsive to said radio frequency field for reflecting at least a portion of light energy exiting from said organic fiber means,
optical fiber means responsive to said light source and independent of said radio frequency field and coupled to said organic fiber means for reflecting a further portion of incident light energy transmitted through said optical fiber means,
means for combining said portions of reflected energy and returning said combined energy to said optical fiber means, and
detection means responsive to said combined portions of energy.

* * * * *